(12) United States Patent
Kathe et al.

(10) Patent No.: US 11,885,781 B2
(45) Date of Patent: Jan. 30, 2024

(54) TITRATION APPARATUS AND TITRATION METHOD

(71) Applicant: Endress+Hauser Conducta GmbH+Co. KG, Gerlingen (DE)

(72) Inventors: Ulrich Kathe, Ludwigsburg (DE); Daniel Schweitzer, Remshalden (DE); Michael Ingelmann, Vaihingen/Enz (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 371 days.

(21) Appl. No.: 17/124,013

(22) Filed: Dec. 16, 2020

(65) Prior Publication Data

US 2021/0181168 A1 Jun. 17, 2021

(30) Foreign Application Priority Data

Dec. 16, 2019 (DE) .................... 10 2019 134 611.8

(51) Int. Cl.
*G01N 31/16* (2006.01)
*G01N 1/14* (2006.01)
*G01N 35/10* (2006.01)

(52) U.S. Cl.
CPC ............ *G01N 31/166* (2013.01); *G01N 1/14* (2013.01); *G01N 35/1016* (2013.01); *G01N 2001/1427* (2013.01)

(58) Field of Classification Search
None
See application file for complete search history.

(56) References Cited

U.S. PATENT DOCUMENTS

| 4,165,218 A * | 8/1979 | Vanhumbeeck ....... C25D 21/14 436/51 |
|---|---|---|
| 5,340,541 A | 8/1994 | Jackson et al. |
| 2012/0080094 A1 | 4/2012 | Martin |
| 2017/0285054 A1* | 10/2017 | Muz ................. G01N 35/00623 |

FOREIGN PATENT DOCUMENTS

| CA | 3010296 A | 12/2018 |
|---|---|---|
| CN | 102149812 A | 8/2011 |
| CN | 105363315 A | 3/2016 |
| CN | 107014426 A | 8/2017 |

(Continued)

*Primary Examiner* — Paul S Hyun
(74) *Attorney, Agent, or Firm* — Kelly J. Smith; Endress+Hauser (USA) Holding, Inc.

(57) ABSTRACT

A titration apparatus includes a titration measuring cell with a titration vessel, a valve device, and a first pump for sucking liquid through a first fluid line into a temporary storage container and transporting it via a second fluid line into the titration vessel. The temporary storage container is arranged in a fluid path between the first pump and the valve device. A third fluid line connects the first pump to the temporary storage container and is filled with a working liquid that does not affect the titration. A second pump conveys a volumetric solution into the titration vessel. An electronic controller controls the first and the second pumps and the valve device to convey a liquid from the first liquid supply into the temporary storage container to transport the liquid into the titration vessel and transport the volumetric solution into the titration vessel to carry out titration.

8 Claims, 4 Drawing Sheets

(56) References Cited

FOREIGN PATENT DOCUMENTS

| | | | |
|---|---|---|---|
| CN | 107449926 | A | 12/2017 |
| CN | 107515272 | A | 12/2017 |
| CN | 206788047 | U | 12/2017 |
| CN | 107894489 | A | 4/2018 |
| CN | 209215275 | U | 8/2019 |
| DE | 3014250 | A1 | 10/1980 |
| GB | 880428 | A | 10/1961 |
| WO | 2019199730 | A1 | 10/2019 |

* cited by examiner

TITRATION APPARATUS AND TITRATION METHOD

CROSS-REFERENCE TO RELATED APPLICATION

The present application is related to and claims the priority benefit of German Patent Application No. 10 2019 134 611.8, filed on Dec. 16, 2019, the entire contents of which are incorporated herein by reference.

TECHNICAL FIELD

The present disclosure relates to a titration apparatus for carrying out titration in an automated or partially automated manner in order to determine a measured variable that depends on the concentration of an analyte in a liquid sample. The present disclosure also relates to a titration method.

BACKGROUND

Titration is a method of quantitative chemical analysis. In this case, an analyte or titrand, which is contained in an unknown concentration in a solution to be titrated, is reacted in a chemical reaction with a reactant, the titrator, which is added to the solution to be titrated in a volumetric solution of known concentration of the titrator. The volumetric solution is added to the solution to be titrated until an effect that can be detected visually or by means of a detection system and that marks the equivalence point of the titration occurs. The effect can be, for example, an abrupt change in an optical property, such as a color change, an abrupt change in the pH value or an abrupt change in the redox potential of the solution to be titrated. In the case of titrations with which reaching the equivalence point is detectable by a color change, the equivalence point is also referred to as the transition point. It forms the endpoint of titration.

The concentration of the titrand can be determined from the volume of the volumetric solution added until the equivalence point is reached. The titrand may be an analyte that is contained in a liquid sample and whose the concentration is to be determined by means of titration (direct titration). However, the titrand may also be a substance whose concentration in the solution to be titrated is a measure for the concentration of an analyte different from the titrand in a liquid sample from which a solution to be titrated was formed by adding one or more further substances (indirect titration). For example, a reactant can be added in excess to a liquid sample prior to titration, which reactant reacts with an analyte contained in the liquid sample, and back titration of the excess reactant as the titrand can then be carried out in the thus produced solution to be titrated. The original concentration of the analyte in the liquid sample can be deduced from the quantity, determined by titration, of titrand in the solution.

There is a plurality of different titration methods, e.g., acid-base titrations, conductivity titrations, precipitation titrations, complexometric titrations or redox titrations. Before the start of the actual titration, it may be necessary to pretreat the liquid sample, e.g., by chemical decomposition, by adjusting and/or buffering the pH value of the sample, by adding an indicator, by dilution or, as already mentioned, by adding a reactant reacting with the analyte to be determined in the liquid sample. The thus produced solution to be titrated is then titrated by adding the volumetric solution.

The type of titration method also determines the type of detection system for determining the titration endpoint. For example, pH sensors, photometric sensors, ion-selective electrodes (ISE), turbidity sensors, conductivity measuring cells or potentiometric redox sensors are used for detecting the equivalence point. In part, the detection accuracy of the titration endpoint is improved by adding excipients, such as indicator dyes.

Automatically or semi-automatically operable titration apparatuses which can be used, for example, in automatic process analyzers are known. Process analyzers are used for the automated determination of measured variables whose value depends on the concentration of one or more analytes in a generally liquid sample. Such measured variables are, for example, concentrations of certain substances, e.g., ion concentrations or concentrations of certain chemical molecular compounds or sum parameters, such as total organic carbon (TOC), chemical oxygen demand (CSB or COD), total nitrogen content (TN) or the permanganate index (PMI). Such process analyzers are used, for example, in the process industry, e.g., in processes for purifying or conditioning water, or in the examination and monitoring of water in supply networks or in environmental analysis.

The central element of such a titration apparatus is the titration measuring cell. As a rule, it has a titration vessel, which receives the solutions involved in titration, along with a sensor, which serves to detect the equivalence point. The sensor may, for example, be an electrochemical sensor integrated into the titration vessel and in contact with the solution to be titrated during operation or an optical sensor. Alternatively, the sensor may also be an optical, e.g., photometric, sensor which is arranged outside the titration vessel and radiates measuring radiation through a transparent wall or window of the titration vessel through the titration vessel and the solution contained therein.

For the conveying and metering of all liquids, automatically or semi-automatically operable titration apparatuses have a liquid management system which comprises pumps, e.g., in the form of syringes, along with valves, control elements and lines. With the aid of the liquid management system, liquids can be taken from reservoirs and transported into the titration measuring cell and removed therefrom. High demands are placed on the liquid management with regard to metering accuracy and precision of the delivery rate. Carryover effects are to be avoided.

In known titration apparatuses, each of the liquids involved in the pretreatment of the sample and the titration, along with the possibly existing cleaning and dilution liquids or standard solutions for the calibration of the apparatus, is held in a separate reservoir which is connected to the titration vessel via its own fluid line. A separate pump or suction device is moreover assigned to each reservoir and serves specifically for conveying and metering the liquid contained in the reservoir assigned to it. A disadvantage of such devices is the high equipment expenditure, since a plurality of pumps, individual valves and lines is required. Such a liquid management system not only requires a relatively large amount of space, particularly in the region of the titration vessel for the plurality of liquid lines opening thereinto, but is also maintenance-intensive. In order to avoid substances remaining in the lines from earlier titrations being carried over into the liquids used in a current titration, a large volume of rinsing liquid is also needed in such a structure in order to rinse and clean all lines between titrations carried out successively.

In order to simplify the structure of the liquid management system, it is conceivable to fluidically connect several of the reservoirs for different liquids to a central fluid line opening into the titration vessel and to a single pump, e.g., a piston reciprocating pump in the form of a syringe, which serves for conveying and metering the liquids via the central fluid line. The connection of the individual reservoirs to the central fluid line can be realized by means of a central valve device, e.g., by means of a multiway or manifold valve or a valve block. However, this solution has the disadvantage that the intake of the liquids into the single pump is associated with carryover to a high degree. In order to prevent this, intermediate rinsing steps are necessary in each case, which in turn lead to a high consumption of rinsing liquid and a long process duration or a low realizable measuring frequency.

SUMMARY

It is therefore an object of the present disclosure to specify an improved generic titration apparatus. With a simple and cost-effective structure, the titration apparatus is preferably to allow precise, rapid and low-carryover metering and conveying of the liquids required for titration.

This object is achieved according to the present disclosure by the titration apparatus according to claim 1. Advantageous embodiments are listed in the dependent claims.

The titration apparatus according to the present disclosure comprises a titration measuring cell which has a titration vessel, a first fluid line connected to a first liquid supply, a second fluid line opening into the titration vessel, a first pump configured to transport liquid through the second fluid line into the titration vessel, a valve device, a temporary storage container arranged in a fluid path between the first pump and the valve device and designed as a fluid line, and a third fluid line connecting the first pump to the temporary storage container and filled with a working liquid at least in a section adjacent to the first pump.

The valve device is configured to selectively block or unblock the first fluid line for fluid transport through the first fluid line into the temporary storage container by means of the first pump, and is furthermore configured to selectively block or unblock transport of liquid from the temporary storage container through the second fluid line using the first pump. The titration apparatus further includes a fourth fluid line opening into the titration vessel, a second pump configured to convey a volumetric solution from a volumetric solution supply and to transport the volumetric solution taken from the volumetric solution supply through the fourth fluid line into the titration vessel, and an electronic controller configured to control the first and the second pumps and the valve device in order to convey a liquid from the first liquid supply into the temporary storage container in order to transport the liquid from the temporary storage container via the second fluid line into the titration vessel and transport the volumetric solution from the volumetric solution supply via the fourth fluid line into the titration vessel in order to carry out titration, and the chemical composition of the working liquid is selected such that the working liquid does not affect the titration to be carried out.

The liquid taken from the first liquid supply and to be transported into the titration vessel may be a liquid sample containing an analyte whose concentration in the sample is to be determined by titration by means of the titration apparatus. The liquid sample may also contain several analytes, a sum parameter whose value is to be determined by titration by means of the titration apparatus depending on their concentration in the sample.

The first fluid line can be connected to the valve device, so that this valve device can selectively establish a fluidic connection between the first fluid line and the temporary storage container in order to unblock the first fluid line for fluid transport through the first fluid line into the temporary storage container by means of the first pump. Likewise, the second fluid line can be connected to the valve device, so that this valve device can selectively establish a fluidic connection between the second fluid line and the temporary storage container in order to unblock the second fluid line for fluid transport from the temporary storage container through the second fluid line into the titration vessel by means of the first pump.

In that the first pump is connected to the valve device via a temporary storage container designed or configured as a fluid line and to the first liquid supply via this valve device and the first fluid line, and in that a third fluid line connecting the first pump to the temporary storage container is filled with a working liquid, which does not affect the titration, at least in a section adjacent to the pump, only working liquid passes from the third fluid line to the first pump and/or into the first pump when liquid is sucked from the liquid supply by means of the first pump, while the liquid sucked from the first liquid supply is transported only into the temporary storage container. The first pump is thus coupled in an incompressible manner via the working liquid to the liquid sucked from the first liquid supply and enables precise metering operations. When the sucked-in liquid is transported from the temporary storage container designed as a fluid line, e.g., as a hose or pipeline, via the valve device and the second fluid line into the titration vessel, the working liquid transported back into the temporary storage container by the first pump displaces the liquid which has passed into the temporary storage container from the first liquid supply during the suction. Carryover of the liquid into another liquid sucked in in a later step by the same first pump is avoided in this way, or at least considerably reduced in comparison with solutions known from the prior art.

This structure therefore also makes it possible to use one and the same pump for conveying and metering different liquids from different liquid reservoirs into the titration vessel and to thus realize a simple and cost-effective structure without a risk of carryover, which would have to be counteracted by additional rinsing steps.

In an advantageous embodiment, the titration apparatus therefore further comprises at least one second liquid supply connected to a fifth fluid line, wherein the first fluid line or the fifth fluid line can selectively be fluidically connected to the first pump for conveying liquid from the first liquid supply or from the second liquid supply into the temporary storage container. Naturally, the titration apparatus may comprise a plurality of further liquid supplies which can be connected analogously to the first pump in order to convey and meter all liquids or all liquids except for the volumetric solution by means of the first pump.

The term "fluidically connecting" or "establishing a fluidic connection" is understood here and below to mean providing or establishing a fluid path which is unblocked for the flow of fluids. A fluidic connection can be established, for example, by opening a valve blocking a fluid line or by establishing or unblocking a connection of two fluid lines by means of a valve unit having several inlets and outlets connected to fluid lines.

In one embodiment, the valve device can be configured, for example, to selectively block or unblock the fifth fluid line for fluid transport into the temporary storage container. In this embodiment, the electronic controller may be configured to control the first pump and the valve device in order to selectively convey liquid from the first or the second liquid supply into the temporary storage container and to then convey it from the temporary storage container into the titration vessel.

The first pump can be a reciprocating piston pump, particularly a syringe pump, which has a cavity, particularly a cylinder, into which an inlet opening fluidically connectible to the temporary storage container via the third fluid line opens, and in which a piston is movably arranged in order to suck liquid via the inlet opening into the cavity or displace liquid from the cavity via the inlet opening in the direction of the temporary storage container.

The region of the cavity adjacent to the side of the piston facing the inlet opening, the third fluid line and optionally a section of the temporary storage container adjacent to the third fluid line can be filled with the working liquid.

The first pump and the third fluid line can be connectible to a working liquid supply via a valve, e.g., a multiway valve arranged in the third fluid line. The first pump can thus suck in new working liquid.

A liquid which contains neither one of the dissolved substances contained in the solution to be titrated nor a reactant dissolved in the volumetric solution and intended for chemical reaction with a substance contained in the solution, comes into consideration as working liquid. For example, a pure solvent, e.g., distilled water, a liquid which is not miscible with the liquids to be metered, or a solution which contains only substances which do not affect the titration, particularly the determination of the parameter to be determined with the titration, may be considered as working liquid.

In a particularly advantageous embodiment, the solution contained in the titration vessel after the end of titration can serve as working liquid. In this solution, the titrator added with the volumetric solution and the titrand present in the solution to be titrated are present in equivalent proportions (i.e., the solution is at the equivalence point of titration), so that the solution behaves indifferently to a solution to be titrated in a titration to be performed later and to the volumetric solution to be added. It can therefore serve as an indifferent working liquid or for diluting the sample to be analyzed quantitatively. In this embodiment, the working liquid supply can be fluidically connectible to the titration vessel in order to drain into the working liquid supply the solution present in the titration vessel after the end of titration.

The working liquid supply may be connected to the titration vessel via the valve device, wherein the electronic controller is configured to control the first pump and the valve device in order to transport the liquid present in the titration vessel after the end of carrying out the titration from the titration vessel into the working liquid supply.

The fourth fluid line, which opens into the titration vessel and via which the volumetric solution is introduced into the titration vessel during titration, can end at a height of the titration vessel that is dimensioned such that the end of the fourth fluid line arranged inside the titration vessel is arranged below the liquid level in the titration vessel at least during titration. In this way, a higher precision can be achieved in comparison with the conventional method of adding the volumetric solution in drops from a burette tip arranged above the liquid level to the titrating solution, with which the measurement accuracy is determined by the drop volume. The height at which the end of the fourth fluid line is arranged in the titration vessel can additionally be optimized to the effect that an undesired washing-out of the volumetric solution from the end of the fourth fluid line into the solution to be titrated is minimized. Washing-out can be counteracted by selecting the distance of the end of the fourth fluid line from the liquid surface, i.e., the immersion depth of the fourth fluid line into the solution to be titrated, as small as possible.

The titration measuring cell may comprise a sensor configured to detect a physical or chemical property of a solution present in the titration vessel. The sensor may, for example, be an electrochemical sensor, e.g., a potentiometric sensor, a conductivity sensor or an optical sensor. A pH sensor or a redox sensor may be used as a potentiometric sensor, for example. A turbidity sensor or a photometric sensor, which serves to measure an absorption or extinction of measuring radiation by a solution contained in the titration vessel, may be considered as an optical sensor. The sensor may be integrated into the titration vessel, so that it contacts or dips into a liquid contained in the titration vessel. If the sensor is an optical, e.g., photometric, sensor, the sensor may also be arranged outside the titration vessel. In this case, the wall of the titration vessel is transparent or has windows transparent to the measuring radiation of the sensor, so that a light source of the sensor can radiate the measuring radiation into the titration vessel and a solution contained therein, and a radiation receiver of the sensor can receive the measuring radiation after it passes through the titration vessel and the solution contained therein.

The sensor of the titration measuring cell may be connected to the electronic controller of the titration apparatus in order to output measurement signals thereto. The electronic controller may be configured to receive and process the measurement signals in order to detect, based on the sensor's measurement signals, a change in the physical or chemical property, detected by the sensor, of the solution present in the titration vessel and to determine when the equivalence point of titration is reached. The equivalence point is generally reached when the physical or chemical property changes abruptly or when a measured variable that depends on the physical or chemical property reaches a reference value corresponding to the equivalence point. The electronic controller may furthermore be configured to terminate the titration, i.e., the addition of the volumetric solution by means of the second pump, as soon as the equivalence point is reached.

The electronic controller may comprise a data processing device, e.g., a computer, a measuring transmitter, a memory-programmable logic controller or some other arithmetic unit. It can be formed as a single unit or can be distributed among several units connected to one another for wired or wireless communication. It may comprise one or more operating programs which are used to control the titration apparatus, particularly the pumps, the valves, and optionally the sensor in order to implement the functions and method steps described here. The controller may further comprise an evaluation program that is used to determine the equivalence point from the sensor signals.

The titration apparatus can optionally have a further sensor, which is configured to measure a volume of the volumetric solution conveyed into the titration vessel during titration, e.g., in the form of a flow measured value. This sensor may be integrated, for example, in a reservoir containing the volumetric solution, in the fourth fluid line or in the titration measuring cell. The electronic controller can be connected to this sensor in order to detect and process its measurement signals. Alternatively, the electronic controller may also determine the volume of the volumetric solution conveyed into the titration vessel during titration from the control data of the second pump. For example, the controller may be configured to incrementally convey individual volume units of the volumetric solution into the titration vessel and to count the volume units conveyed until the equivalence point is reached.

The controller can be configured to determine a quantity, e.g., a concentration, of the titrand in the solution to be titrated and present in the titration vessel before the start of the feeding of the volumetric solution, on the basis of the determined volume or a determined mass of the volumetric solution conveyed into the titration vessel and to optionally determine therefrom values of further measured variables, e.g., an analyte concentration in the liquid sample or a sum parameter of the liquid sample.

The present disclosure also comprises a titration method, particularly using the titration apparatus according to one of the embodiments described above. Such titration method may include preparing a solution to be titrated in a titration vessel comprising steps of conveying a liquid using a first pump from a first liquid supply via a first fluid line into a temporary storage container designed as a fluid line, and then conveying into the titration vessel using of the first pump via a second fluid line at least a portion of the liquid transported into the temporary storage container. The first pump is connected to the temporary storage container via a third fluid line and the third fluid line is filled with a working liquid at least in a section adjacent to the first pump. The chemical composition of the working liquid is selected such that the working liquid does not affect the titration to be carried out. Titrating the solution to be titrated by transporting a volumetric solution via a fourth fluid line using a second pump into the titration vessel containing the solution to be titrated.

The titration method can be carried out automatically by means of the controller of the titration apparatus described above.

The liquid taken from the first liquid supply and transported into the titration vessel can be a liquid sample containing an analyte, whose concentration in the liquid sample is to be determined or for which a parameter dependent on the concentration of the analyte in the sample is to be quantified by using the titration method.

In the simplest case, the preparation of the solution to be titrated can consist of metering a single liquid to be analyzed as a sample into the titration vessel. In this case, the analyte whose concentration is to be determined using the titration method is simultaneously the titrand. It is also possible that, in order to prepare the solution to be titrated, further substances are added to the sample initially conveyed from the first liquid supply, in order to adjust or buffer a pH value, for example. In an alternative method, the preparation of the solution to be titrated can comprise conveying and metering the sample containing the analyte from the first reservoir into the titration vessel and conveying and metering into the titration vessel a further liquid containing a reactant intended for chemical reaction with the analyte. In this method variant, the reactant can form the titrand of the titration.

Titration may be terminated based on a signal of a sensor detecting a physical or chemical measured variable of the solution present in the titration vessel. This can be implemented in the manner already described.

A quantity of a titrand present in the solution to be titrated can be determined from the volume of the volumetric solution transported into the titration vessel up to the end of titration. A measured value of a measured variable can be determined from such value, which measured value depends on a concentration of an analyte in the sample used to prepare the solution to be titrated.

In an advantageous embodiment of the method, which is particularly resource-saving, the solution present in the titration vessel after the end of titration, i.e., the titrated solution present at the equivalence point, can be used as working liquid in automatic titration methods carried out subsequently. For this purpose, the solution can be drained from the titration vessel and stored temporarily in a reservoir for working liquid.

BRIEF DESCRIPTION OF THE DRAWINGS

The present disclosure is explained in further detail below on the basis of the comparative examples and exemplary embodiments shown in the figures. The following are shown.

DETAILED DESCRIPTION

Figure 1:
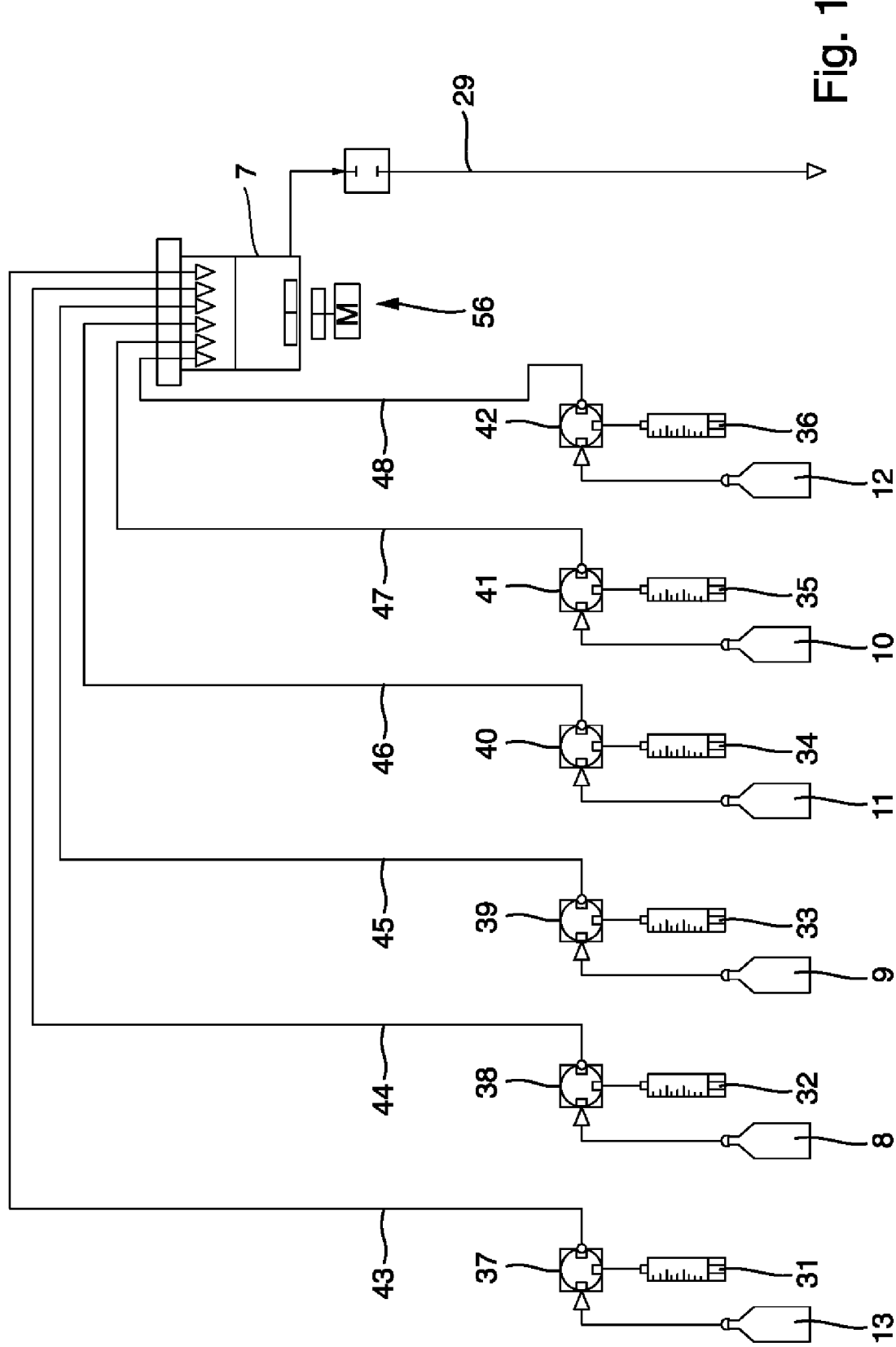
FIG. 1 shows a schematic illustration of a first comparative example of a titration apparatus, with which a separate pump and fluid line is provided for conveying and metering each individual liquid.

FIG. 1 shows, as a first comparative example for illustrating the advantages of the present disclosure, a titration apparatus having individual pumps 31, 32, 33, 34, 35, 36 for transporting and metering liquids from reservoirs 8, 9, 10, 11, 12, 13 into a titration vessel 7 of a titration measuring cell which is otherwise not shown in further detail in FIG. 1.

A sample liquid supply 8, e.g., in the form of a sample receiver, contains a sample liquid which can contain one or more specific analytes that is/are to be quantified by means of the titration apparatus. Such a quantification is understood below to mean, for example, the determination of a concentration of the analyte in the sample liquid or the determination of a value of a parameter dependent on the concentration of the analyte, e.g., a sum parameter, such as COD or the PMI.

The titration apparatus comprises several liquid supplies in the form of liquid containers. A first reservoir 9 contains a dilution liquid, e.g., distilled water. A second reservoir 10 contains a first reagent to be added to the sample liquid in order to prepare a solution to be titrated. A third reservoir 11 contains a second reagent to be added to the sample liquid in order to prepare a solution to be titrated. In the present case, the titration apparatus is designed to determine the PMI (permanganate index). The PMI is a sum parameter for characterizing the organic substances in water. The specification is given in mg/l of $O_2$, a consumption of 4 mg/l of $KMnO_4$ corresponding to approx. 1 mg/l of $O_2$ for the oxidation of organic substances in water. In order to determine the PMI of a liquid sample, the sample is admixed with a predetermined volume of $KMnO_4$ solution of known concentration and sulfuric acid and heated for a predetermined period of time. In the process, a portion of the added permanganate oxidizes the oxidizable water ingredients. The exact consumption of permanganate is determined by adding an excess of sodium oxalate solution and subsequent back titration of the excess oxalate with permanganate solution. This method is specified in accordance with DIN EN ISO 846 (DIN 38409-5). For carrying out the method, the second reservoir 10 can therefore contain sulfuric acid and the third reservoir 11 can contain an oxalate solution. The permanganate volumetric solution for the oxidation of the organic substances in the first step and for the back titration in the second step is contained in a fourth reservoir 12.

The titration apparatus also comprises a fifth reservoir 13 containing a standard solution, i.e., a solution which has a known PMI and which can be used to calibrate or adjust the titration apparatus.

Each of the reservoirs 8, 9, 10, 11, 12, 13 is respectively connected via a first fluid line to a 3/2-way valve 37, 38, 39, 40, 41, 42. Each of the 3/2-way valves 37, 38, 39, 40, 41, 42 respectively connects the first fluid lines to a pump 31, 32, 33, 34, 35, 36 and to a second fluid line 43, 44, 45, 46, 47, 48. The second fluid lines 43, 44, 45, 46, 47, 48 open into the titration vessel 7. All fluid lines are designed as plastic hoses in the present example.

The pumps 31, 32, 33, 34, 35, 36 are each designed as syringes having a cavity with a piston movable therein for generating a positive or negative pressure in the cavity. In order to transport liquid from the reservoir respectively assigned to a pump into the titration vessel 7, a fluidic connection of the cavity of the associated syringe to the reservoir is established by means of the corresponding 3/2-way valve, and liquid is transported into the cavity of the syringe. A fluidic connection of the cavity of the syringe to the second fluid line and the titration cell is subsequently established by means of the 3/2-way valve, and fluid transport from the syringe back into the reservoir is simultaneously prevented. Liquid can thus be transported from the cavity via the second fluid line into the titration vessel 7 by means of the syringe.

In this way, the liquids can be transported one after the other into the titration vessel 7 in order to carry out the above-described titration method for determining the PMI in an automated manner. In order to carry it out in an automated manner, an electronic controller (not shown in FIG. 1) can be provided, which controls the individual pumps and valves according to a sequence program for titration. The titration measuring cell comprises a heater and a magnetic stirrer 56 by means of which the solution prepared in the titration vessel can be heated and stirred. After the end of titration, the titrated solution can be drained via the fluid line 29 into a collecting container for spent liquids (not shown).

The disadvantage of such titration apparatus shown in FIG. 1 is the high number of pumps, valves and lines required. This not only causes a relatively high space requirement, particularly in the region of the titration measuring cell into which a plurality of fluid lines opens, but also makes the apparatus maintenance-intensive, since movable and controllable parts, such as the pumps and valves, can fail and the plastic hoses forming the fluid lines have to be exchanged regularly in any event due to wear.

Figure 2:
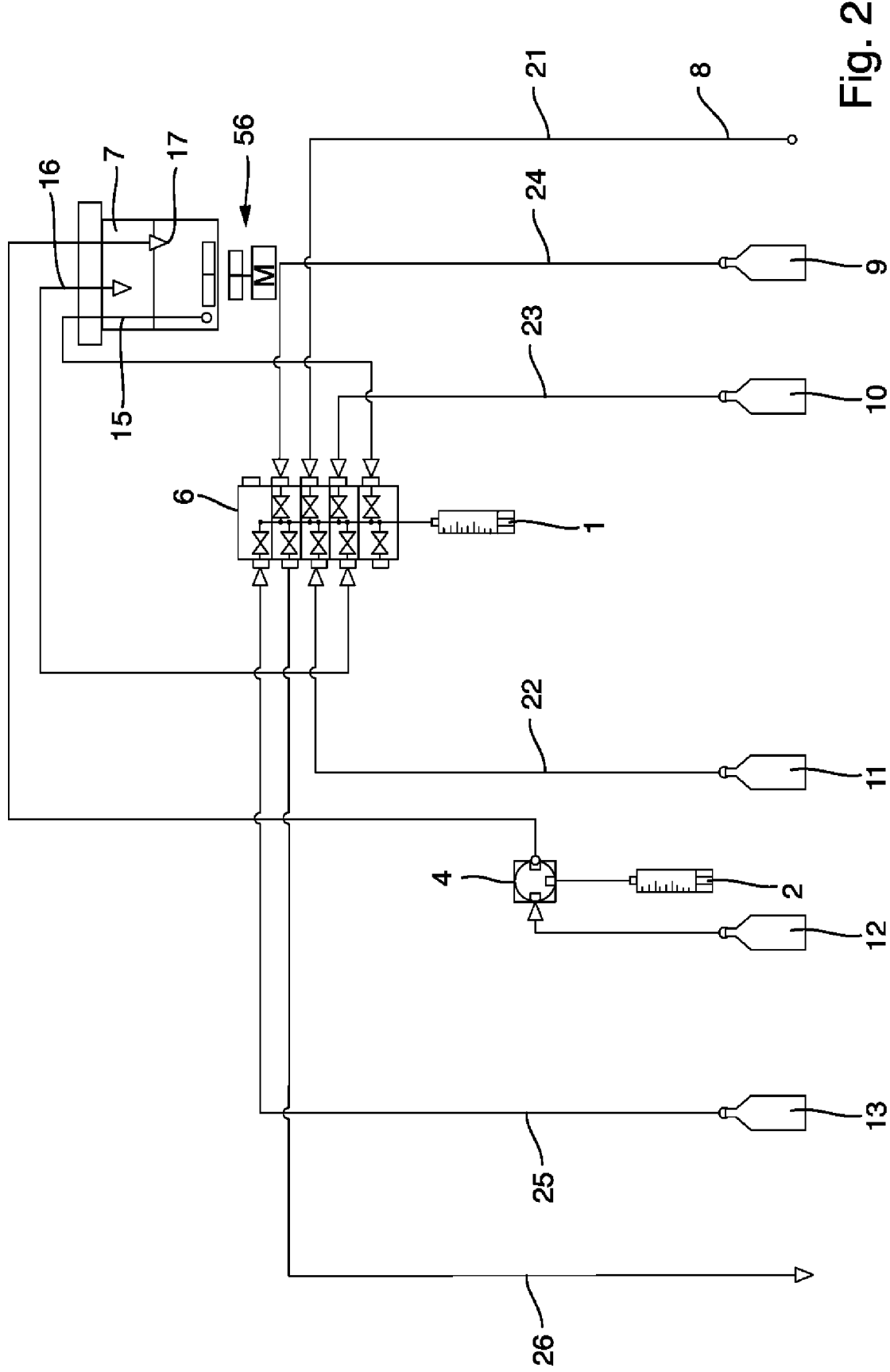
FIG. 2 shows a schematic illustration of a second comparative example of a titration apparatus, with which a common pump is used for conveying and metering several liquids.

A simplified structure of a titration apparatus is illustrated as a second comparative example in FIG. 2. Like the titration apparatus shown in FIG. 1, such titration apparatus comprises several reservoirs 9, 10, 11, 12 with liquids or standard liquids used for titration and a titration measuring cell with a titration vessel 7, a heater and a magnetic stirrer 56.

In contrast to the titration apparatus shown in FIG. 1, however, the titration apparatus of the second comparative example has only two pumps 1, 2, which are both designed as syringe pumps in the present example. The first pump 1 serves as a working syringe for conveying and metering all liquids except for the volumetric solution for titration. The second pump 2 is exclusively used for transporting and metering the volumetric solution. The first pump 1 is connected via a valve device 6, in which a plurality of valves is integrated, to fluid lines 21, 22, 23, 24, 25, 26, which are connected to the reservoirs 9, 10, 11, 12, a sample liquid supply 8, and a collecting container for spent liquids. The first pump 1 is also connected via the valve device 6 to a single fluid line 16, which opens into the titration vessel 7. A fluid line serving as a drain line 15 also opens into the titration vessel 7 and can be fluidically connected via the valve device 6 to the first pump 1 in order to suck spent liquids from the titration vessel. As in the first exemplary embodiment, all fluid lines can be formed by plastic hoses.

Moreover, in the second comparative example shown here, the titration apparatus is designed to determine the PMI of a sample liquid. It may comprise an electronic controller for automatically carrying out titration by controlling valves and pumps. A sample can be transported by means of the first pump 1 via the first fluid line 21 from a sample liquid supply 8 containing the sample liquid via the valve device 1 into the titration vessel 7. For this purpose, the first pump 1 is first fluidically connected to the sample liquid supply 8 by means of the valve device 6, and the pump 1 sucks liquid via the fluid line 21 and the valve device 6 into the interior of the syringe. In a subsequent step, the first pump 1 is connected by means of the valve device 6 to the fluid line 16 opening into the titration vessel 7, and the first pump 1 meters a predetermined quantity of the previously sucked-in sample liquid as a sample via the fluid line 16 into the titration vessel 7. Transporting and metering of further liquids into the titration vessel 7 takes place analogously.

A first reservoir 9 contains a diluent, in the present example water, which may optionally be added to the sample. A second reservoir 10 contains sulfuric acid and a third reservoir 11 contains an oxalate solution as reagents for the titration method specified above for determining the permanganate index. A fourth reservoir 12 contains a permanganate volumetric solution for the oxidation of the organic substances contained in the sample and for the back titration after addition of the oxalate solution to the sample previously mixed with permanganate volumetric solution. The second pump 2 is used for conveying and metering the volumetric solution into the titration vessel 7 and can selectively be connected fluidically via a 3/2-way valve 4 to the reservoir 12 containing the volumetric solution in order to suck the volumetric solution into the syringe, or to the fluid line 17 in order to transport and meter the volumetric solution into the titration vessel 7.

By controlling the first and second pumps 1, 2 along with the valve device 6 and the valve 4, the individual steps of the above-specified titration method for determining the PMI can be carried out by means of the titration apparatus.

Like the titration apparatus of the first comparative example, the titration apparatus comprises a fifth reservoir 13 which contains a standard solution for calibrations. In order to carry out calibrations, this volumetric solution can also be conveyed via a fluid line 25 and the valve device 6 by means of the first pump 1 and can be metered via the valve device 6, then via the fluid line 16, into the titration vessel 7. The titration apparatus further comprises a drain line 26 for spent liquids from the titration vessel 7. Spent liquids can be sucked via the drain line 15 by means of the first pump 1 via the valve device 6 and can then be drained via the valve device 6 and further via the drain line 26.

The structure of the titration apparatus shown here is simpler than the first comparative example and requires less installation space, particularly in the region of the titration measuring cell. On the other hand, the fact that the first pump 1 conveys and meters all liquids results in a high risk of carryover, which can only be reduced by a plurality of rinsing steps, with which a rinsing liquid is transported through the first pump 1 and the fluid lines. However, this disadvantageously leads to the consumption of large quantities of rinsing liquid and to a reduction in the number of titrations that can be carried out within a certain period of time.

Described below are two exemplary embodiments of the present disclosure described herein, with which these disadvantages do not occur.

Figure 3:
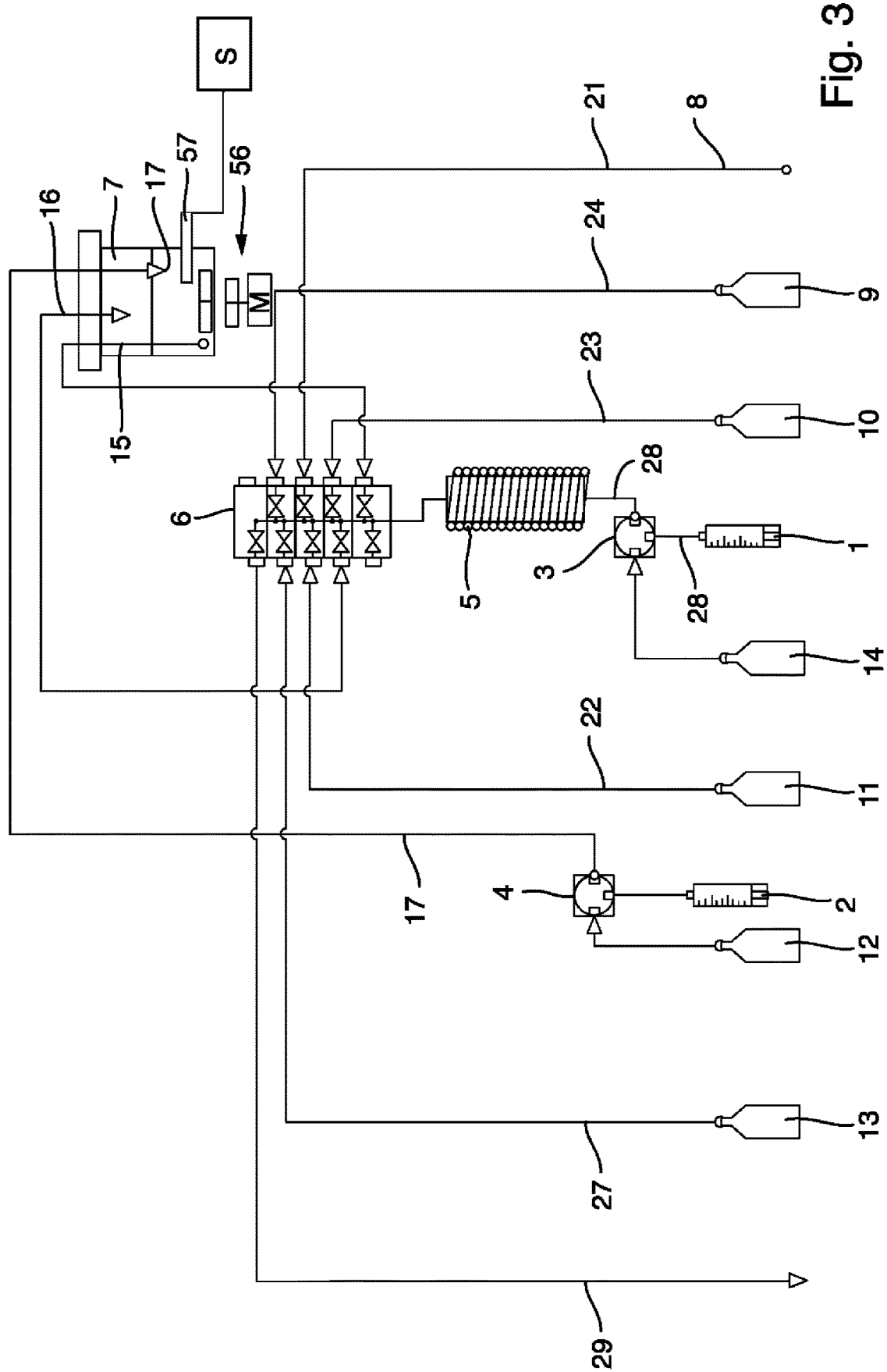
FIG. 3 shows a schematic illustration of a first exemplary embodiment of a titration apparatus according to the present disclosure.

FIG. 3 schematically shows a first exemplary embodiment for a titration apparatus according to the present disclosure. Like the titration apparatuses of the comparative examples according to FIGS. 1 and 2, such titration apparatus is designed to analytically determine the permanganate index of a sample liquid according to the method specified above.

The titration apparatus has a titration measuring cell in which a titration vessel 7 is formed. The titration vessel may be substantially identical to that of the comparative examples described above. The titration measuring cell also comprises a magnetic stirring unit 56 which is designed to stir a solution contained in the titration vessel 7, and a heater, not shown in FIG. 3, for heating liquid contained in the titration vessel 7. The titration measuring cell may further comprise a sensor 57 configured to detect a physical or chemical measured variable of the liquid contained in the titration vessel 7. By means of the sensor 57, it is possible to determine the reaching of the titration endpoint in an automated manner. However, the sensor 57 is not absolutely necessary if the titration apparatus operates only half-automatically. In the present example, the sensor 57 is connected to a controller S which controls the titration apparatus. The sensor 57 can, for example, be an electrochemical, e.g., potentiometric, sensor or a photometric sensor.

In addition to a sample liquid supply 8, the titration apparatus comprises several liquid containers, each of which serves as a liquid supply for individual liquids. The titration apparatus has a first reservoir 9 with a dilution liquid, e.g., water, a second reservoir 10 with a first reagent, here sulfuric acid, and a third reservoir 11 with a second reagent, here an oxalate solution. It further comprises a fourth reservoir 12, in which the permanganate volumetric solution is contained, and a fifth reservoir 13, in which a standard solution for the calibration or adjustment of the titration apparatus is contained.

In order to convey and meter the sample, the dilution liquid, the reagents, and the standard solution, the titration apparatus has a first pump 1 which is configured here as a reciprocating piston pump in the form of a syringe. Instead of a syringe, other pumps can also be used, e.g., peristaltic pumps or other types of pumps. For the alternating fluidic connection of the first pump 1 to the corresponding reservoirs, a central valve device 6 is used, in which a plurality of valves is formed. The reservoirs 9, 10, 11 and 13 are connected to the valve device 6 via fluid lines 22, 23, 24, 27. The first pump 1 can thus serve to convey and meter all liquids present in these containers into the titration vessel 7. The valve device 6 has several inlets and outlets which can be opened by means of valves of the valve device 6 in order to unblock connections between the fluid lines connected to the inlets and outlets and to enable fluid transport. The individual valves of the valve device 6 are closed in the normal state ("normally closed"), i.e., when one of the valves is opened to establish a fluidic connection between the first pump 1 and the fluid line connected to the valve, the other valves of the valve device 6 remain in the closed state unless they are actively activated and thus opened, and block fluid transport through all other fluid lines. All fluid lines are formed by plastic hoses in the exemplary embodiment described here.

The sample liquid supply 8 containing the sample liquid, e.g., a process container from which the liquid can be taken, or a sample receiver, is connected to the valve device 6 via a first fluid line 21. The valve device 6 is also connected to a second fluid line 16 which opens into the titration vessel 7. This second fluid line 16 serves primarily for feeding liquids by means of the first pump 1 via the valve device 6 into the titration vessel 7. It opens into an upper region of the titration vessel, which is generally arranged above the liquid level during operation of the device. In the exemplary embodiment described here, the first pump 1 can therefore also suck in air via the second fluid line 16 and the valve device 6. In an alternative embodiment, however, the first pump 1 can also be connected for this purpose to an additional air intake line or an air intake opening, which in this case does not necessarily have to open into the titration vessel 7.

In a liquid path between the first pump 1 and the valve device 6 is arranged a temporary storage container 5, which is formed by a long fluid line. The temporary storage container 5 can be designed, for example, as a hose or as a pipeline. The hose or pipeline may extend helically in a space-saving manner, as in the example shown here. The inner diameter of the fluid line forming the temporary storage container 5 can be between 0.5 mm and 3.2 mm inclusively. The remaining fluid lines embodied as hoses can have similar inner diameters, e.g., between 0.8 mm and 1.6 mm.

The temporary storage container 5 can be fluidically connected to the first pump 1 via a third fluid line 28. A first value 3 is arranged in the third fluid line 28, which first valve is designed here as a 3/2-way valve and which can selectively block (first position of the valve 3) or unblock (second position of the valve 3) liquid transport by means of the first pump 1 through the third fluid line 28 into the temporary storage container 5. The first valve 3 is also connected to a sixth reservoir 14 in order to fluidically connect the first pump 1 to the sixth reservoir 14 via the section of the third fluid line 28 adjacent to the first pump 1 in the first position of the valve. The sixth reservoir 14 contains a working liquid which behaves indifferently with respect to the titration to be carried out with the titration apparatus; i.e., it does not affect the result of titration. In the example described here, the working liquid can be distilled water, for example. With the first pump 1, working liquid can be taken from the sixth reservoir 14 and transported into the third fluid line 28 and the temporary storage container 5. Via the working liquid present in the third fluid line 28 and the temporary storage container 5, the first pump 1 is hydraulically coupled to the liquids transported via the valve device 6 and the fluid lines 21, 22, 23, 24, 27 from the reservoirs 9, 10, 11 and 13, so that such liquids do not reach the first pump 1. Carryover effects due to the transport and metering of several liquids by means of only a single common pump as in the second comparative example according to FIG. 2 do not occur or only occur to a considerably lesser extent in the exemplary embodiment described here.

The first pump 1 designed as a syringe has a cylinder and a piston movable in the cylinder. Through the piston movement, a cavity which is enclosed by the cylinder and connected to the third fluid line 28 via an inlet opening can be enlarged or reduced in order to, via the inlet opening, draw a liquid into the cavity or to push it out of the cavity. In an extended end position of the piston, the cavity has a maximum volume; in a retracted end position of the piston, the cavity has a minimum volume. The cavity and at least one section of the third fluid line 28 adjacent to the first pump 1 via the inlet opening are filled with the working liquid during operation. Advantageously, the volume of the working liquid is dimensioned such that, in the retracted end position of the piston, the entire fluid path from the inlet opening of the syringe via the third fluid line 28 and the temporary storage container 5 to the valve device 6 is completely filled by the working liquid. In any case, the volume of the working liquid should be at least as large as, advantageously greater than, the volume that can be received by the syringe, so that it is ensured that no other liquid except for the working liquid enters the syringe or the cavity in the syringe when the device is in operation.

A fourth fluid line 17 connects the titration vessel 7 to a second pump 2 via a second valve 4 which is likewise designed as a 3/2-way valve. This second pump is likewise designed as a syringe in the present example. The second valve 4 is also connected to the fourth reservoir 12 containing the volumetric solution. In a first position, it can fluidically connect the fourth reservoir 12 to the second pump 2 and at the same time block the fourth fluid line 17 for fluid transport. In a second position, it can fluidically connect the second pump 2 to the titration vessel 7 via the fourth fluid line 17 and at the same time block transport of liquid from the fourth reservoir 12 in the direction of the second pump 2. The second pump 2 is exclusively used for transporting and metering the volumetric solution into the titration vessel 7.

Moreover, from the valve device 6, a fifth fluid line 29 leads to a collecting container for spent liquids (not shown in FIG. 3). A drain line 15 opening into the lower region of the titration vessel 7 can be connected to the first pump 1 via the valve device 6. In this way, the first pump 1 can serve to suck spent liquid from the titration vessel 7. The first pump 1 can then be fluidically connected to the fifth fluid line 29 via the valve device 6 in order to transport the sucked-off spent liquids into the collecting container for spent liquids.

The controller S of the titration apparatus can be a computer, a measuring transmitter, a memory-programmable logic controller or some other data processing device. In the present example, it is connected to the valve device 6, the first and the second valve 3, 4, the first and the second pump 1, 2, and the sensor 57 and is designed to control them in order to carry out an analytical method for determining the PMI permanganate index of the sample taken from the sample liquid supply 8, e.g., the method described above. The corresponding communication connections between the controller S and the individual parts of the titration apparatus are not shown in FIG. 3 for the sake of clarity. In alternative exemplary embodiments, the controller S can be designed accordingly for carrying out other titration methods for determining other parameters of a sample. It may comprise one or more operating programs which serve for the corresponding control of the titration apparatus for carrying out the method and are configured to execute these operating programs.

The controller S can also be configured to detect the equivalence point of the titration on the basis of the measurement signals of the sensor 57 and thus to determine the end of the method. Based thereon, the controller S can terminate the feeding of volumetric solution into the titration vessel 7. In order to implement these functions, the controller S can comprise an evaluation and operating program and be configured to execute these programs. The controller S can furthermore be configured to calculate and output a value of a parameter of the sample liquid on the basis of the quantity of volumetric solution consumed during titration.

Hereinafter, the function of the titration apparatus shown in FIG. 3 is described with reference to a method for determining the PMI of the sample liquid. All method steps are carried out in an automated manner in the example described here by the controller S, which correspondingly controls the titration apparatus.

At the beginning of a titration or measurement cycle, the titration apparatus is in an initialized state, in which the pistons of the syringes forming the first pump 1 and the second pump 2 are in their retracted end position and the titration vessel 7 is empty. The entire fluid path from the inlet opening of the syringe forming the first pump 1 via the third fluid line and the temporary storage container 5 to the outlet of the valve device 6 connected to the fifth fluid line 29 is filled with the working liquid. Likewise, the fluid lines 21, 22, 23, 24, 27 connecting the sample liquid supply 8, the first reservoir 9, the second reservoir 10, the third reservoir 11 and the fifth reservoir 13 to the valve device 6 are also respectively filled with the liquid from the associated reservoir. This is achieved by sucking the liquid out of the associated reservoir by means of the first pump 1, optionally with several piston strokes, and by transporting the air displaced by the sucked-in liquid from the respective fluid line via the valve device 6 and the fifth fluid drain line 29 into the collecting container for spent liquids. The second fluid line 16 is filled with air in the initialized state. In the initialized state, the fourth fluid line 17 is filled with the volumetric solution from the reservoir 12.

In a first method step, the controller S controls the valve device 6 and the first valve 3 to establish a fluidic connection between the first fluid line 21 and the first pump 1. In this case, the first valve 3 is in its second position, in which it permits fluid transport by means of the first pump 1 via the fluid line 28 into or out of the temporary storage container 5, but blocks transport of working liquid from the sixth reservoir 14. The valve device 6 is controlled in such a way that the valve of the valve device connecting the first fluid line 21 to the temporary storage container 5 is opened, while all other valves of the valve device 6 remain in their closed initial state, so that only the transport of sample liquid from the sample liquid supply 8 via the first fluid line 21 into the temporary storage container 5 is unblocked.

The controller S then controls the first pump 1 to transport a predetermined quantity of the sample liquid into the temporary storage container 5 via the first fluid line 21. In this case, the sample liquid only passes into the temporary storage container 5, but not into the third fluid line 28 or up to the pump 1. If the inner diameter of the fluid line forming the temporary storage container 5 is between 0.5 mm and 3.2 mm as mentioned above, transport speeds above 30 cm/s can be implemented without appreciable mixing of the working liquid and of the liquid to be metered occurring at the interface. Since the working liquid behaves indifferently with respect to the titration to be carried out, a slight mixing of the liquids occurring at the interface between the working liquid and the liquid sample can be tolerated in any event and can optionally be taken into account in the determination and regulation of the liquid volumes to be metered.

In an advantageous variant, before the sample liquid is sucked in via the first fluid line 21, the controller S can control the valve device 6 in such a way that the first pump and the temporary storage container are fluidically connected to the second fluid line 16 and suck a small volume of air through it. If, as described, sample liquid is then sucked in in the first method step, this air volume serves as an air cushion, typically of a length of a few mm, in the fluid line between the working liquid and the sample liquid, so that mixing of sample liquid and working liquid is virtually ruled out and unwanted carryover of sample liquid is prevented.

A fluidic connection of the temporary storage container 5 via the valve device 6 to the second fluid line 16 is then established, while at the same time all other valves of the valve device 6 are closed or remain closed and the first valve 3 remains in the same position as before. Analogously to this and the preceding method step, all valves of the valve unit 6 along with the first and the second valve 3, 4 are also controlled in all subsequent method steps in such a way that the fluidic connections required for transporting liquids or air through specific fluid lines are established and the undesired transport of liquids or air through other fluid lines is blocked. This is no longer mentioned in detail here or in the following steps. The first pump 1 meters the predetermined quantity of the sample liquid as a sample via the valve device 6 into the titration vessel 7. The metering can take place on the basis of the piston stroke of the first pump 1.

In a further optional step, diluent is transported analogously by means of the first pump 1 via the fluid line 24 and the valve device 6 from the first reservoir 9 into the temporary storage container 5 and from there is metered into the titration vessel 7 via the valve device 6 and the second fluid line 16.

In a subsequent step, the first reagent (here: sulfuric acid) is transported in the same way by means of the first pump 1 from the second reservoir 10 via the fluid line 23 and the valve device 6 into the temporary storage container 5 and from there is metered into the titration vessel 7 via the valve device 6 and the second fluid line 16.

In a further step, in a first position of the second valve 4 in which the second pump 2 is fluidically connected to the fourth reservoir 12 and the fluid line 17 is simultaneously blocked by the second valve 4, permanganate volumetric solution is sucked by means of the second pump 2 out of the fourth reservoir 12 into the syringe forming the second pump 2. The second valve 4 is then brought into a second position, in which the second pump 2 is connected to the fourth fluid line 17 and at the same time return transport of the volumetric solution from the second pump 2 into the fourth reservoir 12 is blocked, and a predetermined dose of the volumetric solution is metered into the titration vessel 7.

In the next step, the mixture present in the titration vessel 7 is heated for a certain period of time, e.g., 10 min, in order to achieve the most complete possible oxidation of the organic constituents present in the sample by the permanganate. This can also be controlled by the controller S.

After completion of this oxidation phase, a predetermined quantity of the second reagent (here: an oxalate solution) is first transported by means of the first pump 1 in the manner already described from the third reservoir 11 via the fluid line 22 and the valve device 6 into the temporary storage container 5, and is then metered into the titration vessel 7 via the valve device 6 and the second fluid line 16. Oxalate is added here in high excess, so that the permanganate still present in the solution in titration vessel 7 is completely reduced. The solution thus obtained is the solution to be titrated by means of the titration apparatus, the oxalate still present in the solution forming the titrand.

The actual titration follows in the next step. In this case, by means of the second pump 2, the volumetric solution is taken from the fourth reservoir 12 and transported via the fourth fluid line 17 into the titration vessel 7. This can take place in portions or continuously. During this method step, the end of the fourth fluid line 17 is advantageously arranged below the liquid level in the titration vessel 7, so that the volumetric solution is introduced directly into the solution to be titrated. In this way, higher precision is achieved than when the volumetric solution is dripped through the air from above the liquid level. Advantageously, the distance between the liquid level and the end of the fourth fluid line 17 is selected to be so small that an undesired washing-out of the volumetric solution from the fourth fluid line into the solution to be titrated preferably does not occur or occurs as little as possible. By means of the sensor 57 of the titration measuring cell, which can be a potentiometric redox sensor or an optical sensor for detecting a color change (here: from colorless to violet), the equivalence point and thus the endpoint of titration is detected. For this purpose, the controller S monitors the sensor signal of the sensor 57 for the occurrence of an abrupt change or for a threshold value to be exceeded or fallen below. If this change occurs, the controller S ends the feeding of the permanganate volumetric solution into the titration vessel 7. Based on the control data of the second pump 2, the controller S can determine the quantity of volumetric solution supplied during titration and derive from this value the PMI of the sample.

The risk of carryover is greatly reduced by the hydraulic coupling of the first pump 1 via the working liquid to the individual liquids involved in the method. During the suction and also during subsequent metering, the interface between the working liquid and the liquid sucked in from a liquid supply is arranged within the temporary storage container 5 embodied as a fluid line. At most at this interface, minor mixing of the working liquid with the sucked-in liquid to be metered can take place. Since the working medium behaves indifferently with regard to the titration to be carried out, this mixing is, however, unproblematic. The risk of carryover can be reduced even further if, before a new liquid is sucked in, the control unit in each case sucks in a small quantity of air in order to form an air cushion between the working liquid and the liquid to be metered, as described above with reference to the first method step for metering the sample liquid into the titration vessel 7. As an additional precaution, liquid residues can be removed from the temporary storage container 5 between the individual method steps, in which different liquids are conveyed and metered, in that the first pump 1 conveys some working liquid from the sixth reservoir 14 and transports it via the third fluid line 28 into the temporary storage container 5, while the latter is connected via the valve device 6 to the fifth fluid line 29. As a result, any working liquid contaminated by liquid residues remaining in the temporary storage container 5 is drained into the collecting container for spent liquids.

In order to calibrate the titration apparatus, the method described above can be carried out with a sample of the standard liquid having a known composition and taken from the fifth reservoir 13 via the fluid line 27 instead of with a sample taken from the sample liquid supply 8.

In one method variant, instead of the diluent from the first reservoir 9, the working liquid can also be used to dilute the sample.

Figure 4:
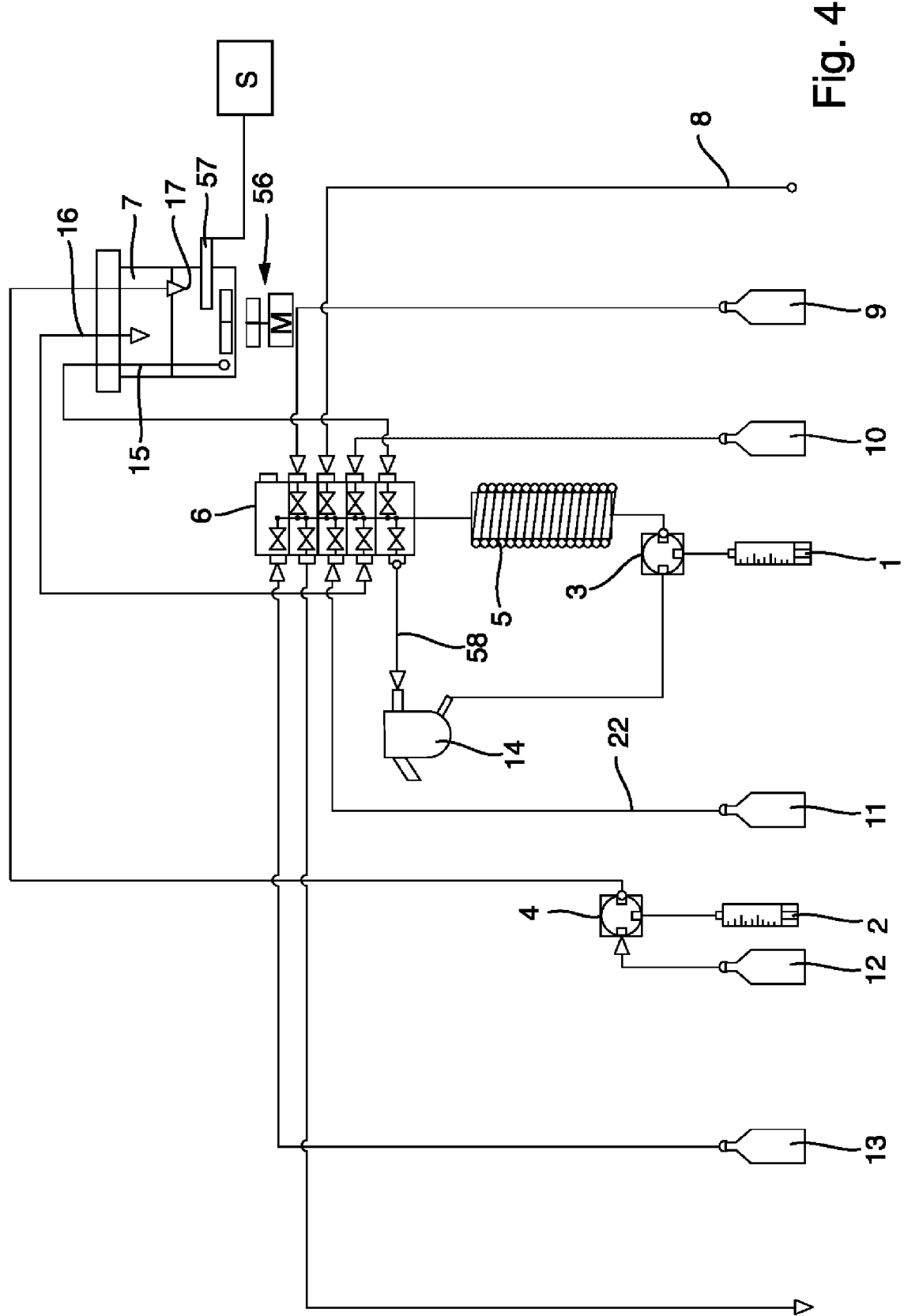
FIG. 4 shows a schematic illustration of a second exemplary embodiment of a titration apparatus according to the present disclosure.

FIG. 4 schematically shows a second exemplary embodiment of the titration apparatus according to the present disclosure. Such titration apparatus is designed largely identically to and functions in the same way as the titration apparatus shown in FIG. 3.

The only difference is that the reservoir 14 for the working liquid in the titration apparatus shown in FIG. 4 is connected to the valve device 6 via an additional fluid line 58. A fluidic connection of the first pump 1 via the temporary storage container 5, the valve device 6 and the drain line 15 opening into a lower region of the titration vessel 7 to the titration vessel 7 can thus be established. This makes it possible to first transport at least a portion of the titrated liquid present in the titration vessel 7 after reaching the equivalence point of titration as working liquid by means of the first pump 1 into the temporary storage container 5 and then into the reservoir 14. Excess titrated liquid may be drained via an overflow port of the reservoir 14. When used as a dilution or working liquid in a titration of a new liquid sample, the titrated solution behaves indifferently; i.e., it does not affect titration. This device and a corresponding titration method using the titrated solution as working liquid is particularly resource-saving and thus advantageous.

The present disclosure is not limited to the embodiments described herein. The exemplary embodiments illustrate the present disclosure with reference to a titration method and a titration apparatus for determining the permanganate index of a liquid sample. However, the present disclosure can also be used analogously in a plurality of other methods with appropriately adapted titration apparatuses, e.g., in acid-base titrations, other redox titrations, complexometric titrations or conductivity titrations.

The invention claimed is:

1. A titration apparatus comprising:
    a titration measuring cell having a titration vessel;
    a first fluid line connected to a first liquid supply;
    a second fluid line opening into the titration vessel;
    a first pump configured to transport liquid through the second fluid line into the titration vessel;
    a valve device;
    a temporary storage container arranged in a fluid path between the first pump and the valve device and configured as a fluid line; and
    a third fluid line connecting the first pump to the temporary storage container and filled with a working liquid in a section adjacent to the first pump;
    wherein the valve device is configured to selectively block or unblock the first fluid line for fluid transport through the first fluid line into the temporary storage container using the first pump, and
    wherein the valve device is configured to selectively block or unblock transport of liquid from the temporary storage container through the second fluid line using the first pump;
    and wherein the titration apparatus further comprises:
        a fourth fluid line opening into the titration vessel;
        a second pump configured to convey a volumetric solution from a volumetric solution supply and to transport the volumetric solution taken from the volumetric solution supply through the fourth fluid line into the titration vessel; and
        an electronic controller configured to control the first and the second pumps and the valve device in order to convey a liquid from the first liquid supply into the temporary storage container,
    in order to transport the liquid from the temporary storage container via the second fluid line into the titration vessel, and
    in order to transport the volumetric solution from the volumetric solution supply via the fourth fluid line into the titration vessel in order to carry out a titration.

2. The titration apparatus of claim 1,
further comprising at least one second liquid supply connected to a fifth fluid line, wherein the first fluid line or the fifth fluid line can selectively be fluidically connected to the first pump for conveying liquid from the first liquid supply or from the at least one second liquid supply into the temporary storage container using the first pump.

3. The titration apparatus of claim 2,
wherein the valve device is configured to selectively block or unblock the fifth fluid line for fluid transport into the temporary storage container,
and wherein the electronic controller is configured to control the first pump and the valve device to selectively convey liquid from the first or the at least one second liquid supply into the temporary storage container and to then convey it from the temporary storage container into the titration vessel.

4. The titration apparatus of claim 1,
wherein the first pump is a reciprocating piston pump having a cavity into which an inlet opening fluidically connectible to the temporary storage container via the third fluid line opens, and in which a piston is movably arranged in order to suck liquid via the inlet opening into the cavity or displace liquid from the cavity via the inlet opening in the direction of the temporary storage container.

5. The titration apparatus of claim 4,
wherein a region of the cavity adjacent the side of the piston facing the inlet opening, the third fluid line, and a section of the temporary storage container adjacent to the third fluid line comprise the working liquid.

6. The titration apparatus of claim 1,
wherein the first pump or the third fluid line is connected to the working liquid supply via the valve device.

7. The titration apparatus of claim 6,
wherein the working liquid supply is connected to the titration vessel via the valve device, and wherein the electronic controller is configured to control the first pump and the valve device to transport the liquid present in the titration vessel from the titration vessel into the working liquid supply after the end of carrying out the titration.

8. The titration apparatus of claim 1,
further comprising a sensor configured to detect a physical or chemical property of a solution present in the titration vessel.

* * * * *